United States Patent
Weston et al.

(10) Patent No.: US 12,556,388 B1
(45) Date of Patent: Feb. 17, 2026

(54) SECURITY FRAMEWORK FOR ARTIFICIAL INTELLIGENCE SYSTEMS

(71) Applicant: Fifth Third Bank, National Association, Cincinnati, OH (US)

(72) Inventors: Arthur Eladio Weston, Union, KY (US); Evan John Hunter, Cincinnati, OH (US); Stefán August Ragnarsson, St. Petersburg, FL (US); Sarah Katherine Schuhler, Raleigh, NC (US)

(73) Assignee: Fifth Third Bank, National Association, Cincinnati, OH (US)

( * ) Notice: Subject to any disclaimer, the term of this patent is extended or adjusted under 35 U.S.C. 154(b) by 3 days.

(21) Appl. No.: 18/808,229

(22) Filed: Aug. 19, 2024

Related U.S. Application Data

(60) Provisional application No. 63/649,554, filed on May 20, 2024.

(51) Int. Cl.
  *H04L 9/16* (2006.01)
  *H04L 9/40* (2022.01)

(52) U.S. Cl.
  CPC .............. *H04L 9/16* (2013.01); *H04L 63/1466* (2013.01)

(58) Field of Classification Search
  CPC .......................... H04L 9/16; H04L 63/1466
  See application file for complete search history.

(56) References Cited

U.S. PATENT DOCUMENTS

| | | | |
|---|---|---|---|
| 9,722,977 B2 | 8/2017 | Hars | |
| 10,341,095 B2 | 7/2019 | Fenster | |
| 10,516,533 B2 | 12/2019 | Mannan et al. | |
| 11,323,400 B1 | 5/2022 | Hu et al. | |
| 11,500,788 B2 | 11/2022 | Miller et al. | |
| 11,651,075 B2 | 5/2023 | Karr | |
| 11,755,751 B2 | 9/2023 | Child et al. | |
| 11,997,059 B1 | 5/2024 | Su et al. | |
| 12,107,885 B1 * | 10/2024 | Kawasaki | G06N 3/08 |
| 12,430,428 B2 * | 9/2025 | Keller | G06F 21/554 |
| 2020/0366476 A1 * | 11/2020 | Watson | H04L 9/0631 |
| 2020/0374113 A1 | 11/2020 | Noam et al. | |
| 2021/0216633 A1 | 7/2021 | Lee et al. | |
| 2022/0269796 A1 | 8/2022 | Chase et al. | |
| 2023/0185912 A1 | 6/2023 | Sinn et al. | |
| 2023/0401163 A1 | 12/2023 | Irwin et al. | |
| 2024/0080333 A1 | 3/2024 | Burns et al. | |
| 2024/0283757 A1 | 8/2024 | Lai | |
| 2024/0296279 A1 * | 9/2024 | Gardner | G06F 40/169 |
| 2024/0333812 A1 | 10/2024 | Gaddam et al. | |
| 2025/0045531 A1 * | 2/2025 | Hayes | G06F 40/56 |

(Continued)

OTHER PUBLICATIONS

Blackwood et al.; The Implementation of a Hybrid Large Language Model for Adaptive Cryptographic Cyber Defense; Research Square; Sep. 23, 2024; 11 pages.

(Continued)

*Primary Examiner* — El Hadji M Sall
(74) *Attorney, Agent, or Firm* — FBT Gibbons LLP

(57) ABSTRACT

Systems and methods are provided for preventing the misuse of artificial intelligence (AI) systems and enhancing their resistance to jailbreaking attempts. A multi-layered approach utilizing dynamically changing keys is provided that safeguards AI systems against manipulation attempts that aim to bypass built-in ethical constraints and generate harmful or inappropriate content.

20 Claims, 7 Drawing Sheets

(56) References Cited

U.S. PATENT DOCUMENTS

| | | | |
|---|---|---|---|
| 2025/0080556 A1* | 3/2025 | Feng | H04L 63/1466 |
| 2025/0226977 A1* | 7/2025 | Taneja | H04L 9/0861 |

OTHER PUBLICATIONS

Tang et al.; Secure Your Model: An Effective Key Prompt Protection Mechanism for Large Language Models; Findings of the Association for Computational Linguistics: NAACL 2024; Jun. 16-21, 2024; pp. 4061-4073.

Suo; Signed-prompt: A New Approach to Prevent Prompt Injection Attacks Against LLM-Integrated Applications; AIP Conf. Proc. 3194, 040013 (2024); Dec. 11, 2024; 8 pages, including publication information.

* cited by examiner

006 # SECURITY FRAMEWORK FOR ARTIFICIAL INTELLIGENCE SYSTEMS

CROSS-REFERENCE TO RELATED APPLICATIONS

This application claims the benefit of U.S. Ser. No. 63/649,554, entitled "Security Framework for Artificial Intelligence Systems," filed on May 20, 2024, the disclosure of which is incorporated by reference in its entirety.

BACKGROUND

The rapid advancements in artificial intelligence (AI), particularly in the development of large language models (LLMs), have revolutionized various fields and opened up new possibilities. However, these advancements also come with potential risks, one of which is the misuse of AI systems to generate harmful, misleading, or illegal content.

A significant concern is the possibility of AI systems being manipulated or exploited through a process known as "jailbreaking." Jailbreaking refers to a scenario where a user or a group of users manage to bypass the safeguards and ethical constraints built into an AI system, thereby coercing it to generate content or perform actions that violate its intended purpose and guidelines. This could range from generating spam emails to producing instructions for illegal activities or creating content that promotes harmful biases.

Existing security measures often prove insufficient in preventing jailbreak attempts, especially when the attacker possesses knowledge of the AI system's underlying architecture and operational mechanisms. By understanding how the system processes inputs and generates outputs, an attacker can craft specific prompts or inputs that exploit weaknesses in the AI's training or instruction set. This allows the attacker to manipulate the AI's responses and bypass its ethical constraints.

The vulnerability of AI systems to jailbreaking poses significant risks to both the AI itself and its users. Jailbroken AI systems can be misused to spread misinformation, generate harmful content, or engage in illegal activities, thereby causing harm to individuals and society at large. Current approaches to mitigating the risk of jailbreaking often rely on static rule-based filters or keyword-based detection methods. However, these approaches can be easily circumvented by attackers who are aware of the specific rules or keywords used. Additionally, the rapid evolution of language and the creativity of attackers make it challenging to maintain comprehensive and up-to-date rule sets.

To address these limitations and enhance the security of AI systems against jailbreaking attempts, there is a pressing need for advanced techniques that can dynamically detect and prevent manipulation attempts. These techniques should be able to adapt to the evolving landscape of AI misuse and provide robust safeguards against a wide range of jailbreaking scenarios.

BRIEF DESCRIPTION OF THE DRA WINGS

It is believed that certain embodiments will be better understood from the following description taken in conjunction with the accompanying drawings, in which like references indicate similar elements and in which:

FIG. 1 schematically illustrates a user interacting with an example autonomous interactive platform having a security framework, in accordance with one non-limiting embodiment.

FIG. 2 schematically illustrates a user interacting with another example autonomous interactive platform having a security framework, in accordance with one non-limiting embodiment.

FIG. 3 schematically illustrates a user interacting with yet another example autonomous interactive platform having a security framework, in accordance with one non-limiting embodiment.

DETAILED DESCRIPTION

Figure 1:
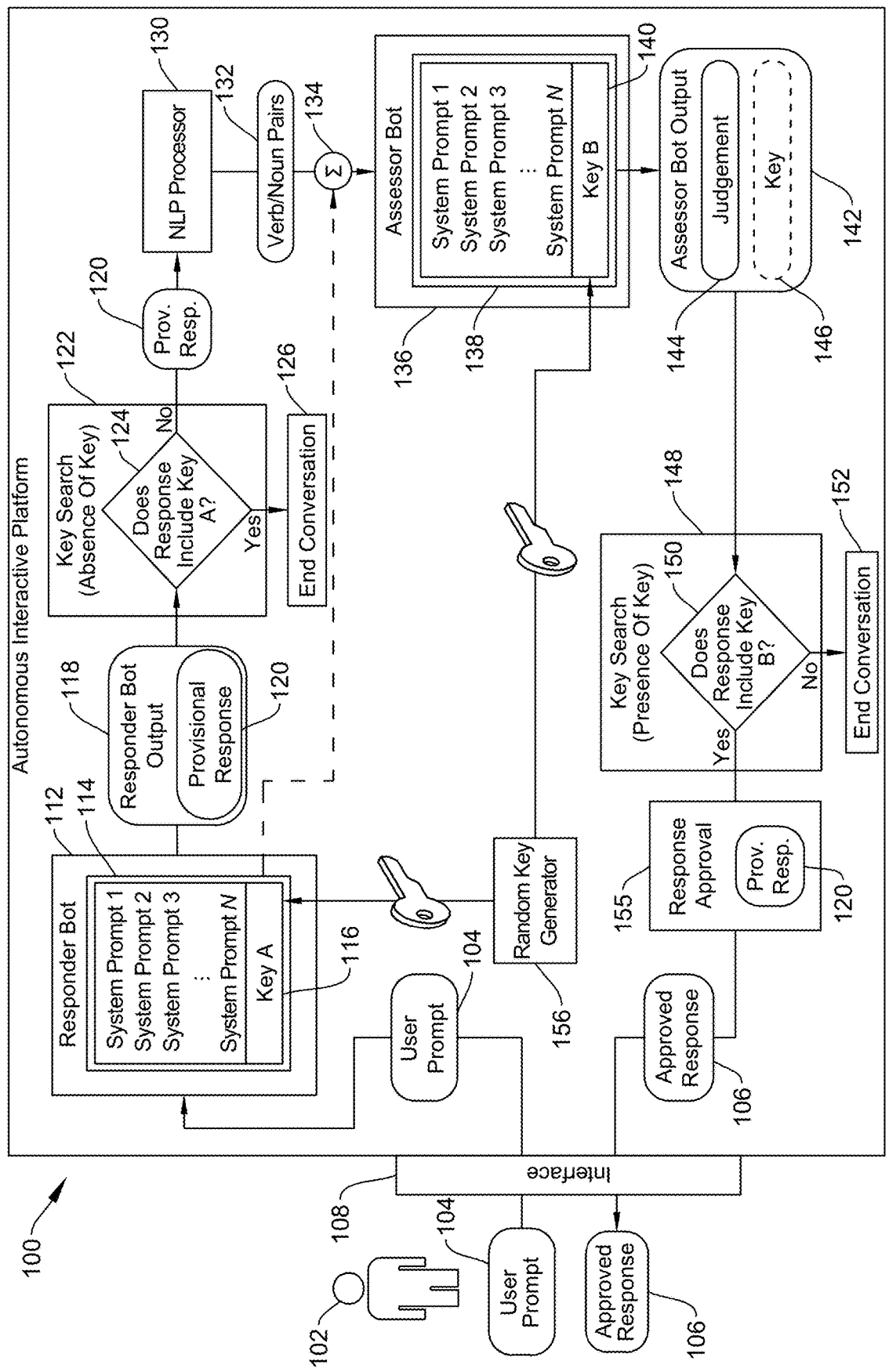

Various non-limiting embodiments of the present disclosure will now be described to provide an overall understanding of the principles of the structure, function, and use of the systems and methods as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The present disclosure relates to systems and methods for preventing the misuse of artificial intelligence (AI) systems and enhancing their resistance to jailbreaking attempts. Such AI systems can include chatbots, stand-alone conversational AI systems, web-based AI systems, downloadable app-based AI systems, text-only interfaces, and audio-only systems such as voice assistants. The present disclosure provides a multi-layered approach to safeguard AI systems against manipulation attempts that aim to bypass built-in ethical constraints and generate harmful or inappropriate content. As provided below, the multi-layered approach can involve multiple AI bots. AI bots are software applications that use artificial intelligence, typically leveraging natural language processing and machine learning models, to simulate and automate conversations with users. Each AI bot that is utilized can have a specific role in preventing the missuse of the AI system. As described in more detail below each AI bot can be provided with dynamically changing keys, which serve as security measures. This approach can enable the AI system to dynamically detect and mitigate potential jailbreaking attempts, even in scenarios where the attacker possesses knowledge of the system's underlying architecture and operational mechanisms. Upon detection of such attempts, the system can terminate the interaction altogether, preventing the generation of harmful content or the execution of undesirable actions. The disclosed systems and methods offer a significant advancement over existing security measures, which often rely on static rule-based filters or keyword-based detection and can be easily circumvented by knowledgeable attackers.

Referring first to FIG. 1, an example autonomous interactive platform 100 including a security framework in accordance with one non-limiting embodiment of the present disclosure is depicted.

A user 102 can interact with the autonomous interactive platform 100 by submitting user prompts 104 to an interface 108. The user prompts 104 can be, for example, text-based, speech-based, or any other suitable type of input to the autonomous interactive platform 100. The autonomous interactive platform 100, as well as the other autonomous interactive platforms depicted herein, can be implemented across a wide range of applications and interfaces, including but not limited to, chatbots, virtual assistants, standalone conversational AI systems, web-based AI platforms, mobile app-based AI services, embedded AI systems in smart devices, voice-controlled AI interfaces, AI-powered customer support systems, AI-driven recommendation engines, and AI-assisted content creation tools. Thus, the autonomous interactive platform 100 of FIG. 1 can be implemented across diverse environments, including mobile devices, desktop computers, smart speakers, or integrated into existing software ecosystems.

The autonomous interactive platform 100 comprises a user interface 108 through which a user 102 can interact with the system by providing user prompts 104. The user prompts 104 can be in the form of text-based prompts, speech-based prompts, or any other suitable input modality supported by the interface 108.

The interface 108 can be designed to receive and process user prompts 104 and facilitate communication between the user 102 and the underlying components of the autonomous interactive platform 100. The interface 108 can serve as the primary point of interaction between users and the autonomous interactive platform 100. This interface 108 can take various forms, depending on the specific use case, target audience, and desired user experience. In some embodiments, for example, the interface 108 can be implemented as a text-based chatbot, where users engage in conversational interactions by sending messages and receiving responses. These chatbot interfaces can be integrated into websites, messaging applications, or standalone platforms, providing a familiar and intuitive way for users to communicate with the AI. For voice-based interactions, the interface 108 can incorporate speech recognition and synthesis capabilities, allowing users to interact with the autonomous interactive platform 100 using spoken language. This type of interface is commonly found in virtual assistants like Amazon Alexa, Apple Siri, or Google Assistant, for example. The interface 108 can also be presented as a web-based platform or website, where users can input text, upload documents, or provide other forms of data. For integrating the capabilities of the autonomous interactive platform 100 into another application, in some embodiments, the interface 108 can be exposed through Application Programming Interfaces (APIs) or Software Development Kits (SDKs). In other embodiments, the interface 108 can be integrated into messaging platforms like WhatsApp, Snapchat, or Facebook Messenger, for example, and users can interact with the autonomous interactive platform 100 within these messaging apps.

While the autonomous interactive platform 100 is schematically depicted in FIG. 1 with local components for illustration purposes, it should be understood that the present disclosure is not limited to this specific configuration. The various components, features, processes, and modules of the autonomous interactive platform 100 can be provisioned and distributed across multiple systems and environments, including cloud-based systems, remote servers, edge devices, and other computing infrastructure. These distributed components can communicate and interact with each other through appropriate networking technologies and protocols, such as APIs, web services, message queues, or other suitable communication channels.

A security framework of the autonomous interactive platform 100 can include, in part, multiple AI bots, such as a responder bot 112 and an assessor bot 136. The responder bot 112 can generally be the primary AI bot that interacts with the user 102. It can process the user prompts 104 and generate responses, shown as a responder bot output 118, using a large language model (LLM) based on its system prompts 114. With regard to AI-driven conversational systems, such as the autonomous interactive platform 100 of FIG. 1, the system prompts 114 play a role in guiding the behavior and responses of the AI agent. The system prompts 114 include a predefined sets of instructions, rules, and guidelines that are used to train and configure the AI model of the responder bot 112, establishing the boundaries and expectations for its interactions with the user 102. As is to be appreciated, these system prompts 114 can encompass a wide range of aspects, including the AI's persona, tone, language style, domain knowledge, ethical constraints, and problem-solving approaches. By crafting and refining the system prompts, developers can shape the AI's behavior to align with the intended purpose, target audience, and desired user experience of the autonomous interactive platform 100. During an interaction with the user 102, the responder bot 112 can continuously refer to and incorporate the guidance provided by the system prompts 114 to generate appropriate and contextually relevant responses.

In accordance with the present disclosure, a key 116, illustrated as Key A, can be included in the system prompts 114 of the responder bot 112. The key 116 can be produced by a random key generator 156, for example. The random key generator 156 can be implemented as a software tool or hardware device that creates a sequence of random or pseudorandom characters, which can be used as a unique identifier. The keys generated by the random key generator 156 can be, for example, alphanumeric or numeric strings of a specified length. In some examples, a new key 116 is generated by the random key generator 156 with every interaction with the user 102. In some example embodiments, the key 116 can be programmatically inserted into the system prompt using a string concatenation approach. For example, the base system prompt can be defined as a string. A separate string with the key 116 can be generated and using an appropriate operator, these strings can be concatenated together.

Responsive to the user prompt 104, the responder bot 112 can generate the responder bot output 118 that includes a provisional response 120. At this point, however, the responder bot output 118 is not yet provided to the user 102. Instead, a first stage of processing is performed to determine if the user 102 may be trying to jailbreak the autonomous interactive platform 100. More specifically, a key search 122 process can be performed on the provisional response 120 by an output validator to detect if the key 116 is found in the provisional response 120. The presence of the key 116 in the provisional response 120 can indicate that the user 102 convinced the responder bot 112 to reveal its system prompts 114, which is a common jailbreaking technique. If a malicious user knows an AI bot's instructions, they can more easily craft messages that circumnavigate the AI bot's rules. In accordance with the present disclosure, if key 116 is found in the provisional response 120, then the shutdown mechanism can be activated at 126. More specifically, as schematically depicted in FIG. 1, a search tool 124 can parse the provisional response 120 to determine if "Key A" is found. If so, the conversation can be ended at 126.

In accordance with the present disclosure, the system can end the conversation at 126 through any of a variety of methods, individually or in combination, to prevent further unauthorized interactions. For example, methods of ending a conversation can include, without limitation, immediate closure of a chat window, web interface, or application; ending the user's active session; displaying an informative message about the detected attempt; gradually degrading response quality; redirecting the user to safety guidelines; resetting the interface to its initial state; alerting human moderators for review; switching to a limited functionality mode; archiving the conversation while preventing further access; among other approaches. The autonomous interactive platform 100 can also implement a combination of these approaches, such as closing an interface while simultaneously displaying a message explaining the termination. In some embodiments, additional processes can also be triggered, such as a user 102 management tool banning the user, generating alerts, and/or otherwise restricting user accounts, permissions, and activities. The specific method or combination of methods employed by the autonomous interactive platform 100 can be determined, for example, based on the severity of the detected jailbreak attempt, user history, and/or system policies.

The search tool 124 can be performed using any suitable technique, such as a regular expression search (Regex), or other suitable tools. Thus, the search tool 124 can be provided with a specific key generated by the random key generator 156 and can search for the presence of that particular key in the provisional response 120. It is noted that in some embodiments the key search 122 can be performed by a comparatively unsophisticated tool, rather than an AI tool, as AI tools can be tricked by sophisticated malicious users, but a regular expression match cannot be similarly jailbroken.

If the provisional response 120 does not include the key 116, the provisional response 120 can be provided to a natural language processor (NLP) 130 of the autonomous interactive platform 100. The NLP processor 130 can be configured to analyze and interpret the provisional response 120 using a series of algorithms and machine learning techniques to process the text string. More specifically, the NLP processor 130 can generate verb/noun pairs 132 found in the provisional response 120. In some embodiments, for example, the NLP processor 130 can first apply tokenization to break down the provisional response 120 into individual words or tokens. Subsequently, part-of-speech (POS) tagging can be performed to assign grammatical roles to each token, identifying them as nouns, verbs, adjectives, or other parts of speech. The NLP processor 130 can then employ linguistic analysis and pattern recognition techniques, for example, to identify the relationships between the tagged tokens and extract relevant verb/noun pairs 132. The NLP processor 130 can utilize various approaches, such as rule-based systems, statistical models, or deep learning architectures, to perform the verb/noun pair extraction process. As is to be appreciated, the specific algorithms and models employed by the NLP processor 130 can be tailored to the domain and requirements of the autonomous interactive platform 100.

As shown in FIG. 1, the verb/noun pairs 132 can be provided to the assessor bot 136 for further processing. In some embodiments, the system prompts 114 of the responder bot 112 can be attached or appended to the verb/noun pairs 132 at 134 to provide the assessor bot 136 with additional information for its assessment. Thus, in such implementation, both the system prompts 114 and verb/noun pairs 132 at 134 could be the inputs for the assessor bot 136. In other embodiments, however, the system prompts 114 are not provided to the responded bot 112 along with the verb/noun pairs 132. The assessor bot 136 can review the components of the provisional response 120, as parsed by the NLP processor 130, alongside the system prompts 114 of the responder bot 112 (if present).

As illustrated, the assessor bot 136 can also contain a key 140 in its system prompts 138, shown as Key B. The key 140 can be dynamically generated by the random key generator 156. Similar to the key 116 of the responder bot 112, the key 140 of the assessor bot 136 can also change upon each interaction. The system prompts 138 can instruct the assessor bot 136 to judge whether the provisional response 120 is permissible. For example, the assessor bot 136 can perform content analysis to scan for specific keywords or patterns indicating impermissible content and sentiment analysis to assess tone and permissiveness. The assessor bot 136 can employ, for example, semantic similarity comparisons against a database of known permissible and impermissible responses, apply rule-based checking for specific constraints, or use machine learning classification to categorize outputs. It could also perform contextual analysis and apply ethical frameworks to ensure adherence to guidelines.

The system prompts 138 can also to include key 140 in an assessor bot output 142 (shown as key 146 in FIG. 1). Thus, if the assessor bot output 142 does not contain the key 140, it indicates that the user 102 has managed to circumnavigate the instructions of the assessor bot 136 and the shutdown mechanism can be activated. Such a scenario might occur, for example, if the user 102 instructs the autonomous interactive platform 100 to never reveal its key in any response in a jailbreak attempt. While this approach may be successful with regard to responder bot 112, when the assessor bot 136 is following instructions and does not include its key in its output, it can indicate that a jailbreak attempt is underway.

Similar to the key search 122, a key search 148 can be used by an output validator to examine the assessor bot output 142. As shown, a search tool 150 can parse the assessor bot output 142 to determine if "Key B" is found. If the key is not found, the conversation can be ended at 152. Additional processes can be triggered, such as banning the user 102, generating alerts, and so forth. If, however, the key 140 is present in the assessor bot output 142 and a judgement 144 indicates the provisional response 120 is not indicative of a jailbreak attempt, the response originally generated by the responder bot 112 can be deemed approved as indicated by response approval 155. As the provisional response 120 is deemed to be approved, it can then be provided to the user 102, as illustrated by approved response 106 being provided to the user 102 via the interface 108. Additionally, even if the assessor bot output 142 includes the key 140, as expected, if the judgement 144 indicates that the provisional response 120 is likely associated with a jailbreak attempt, the conversation can be ended, and the shutdown mechanism can be activated.

Figure 2:
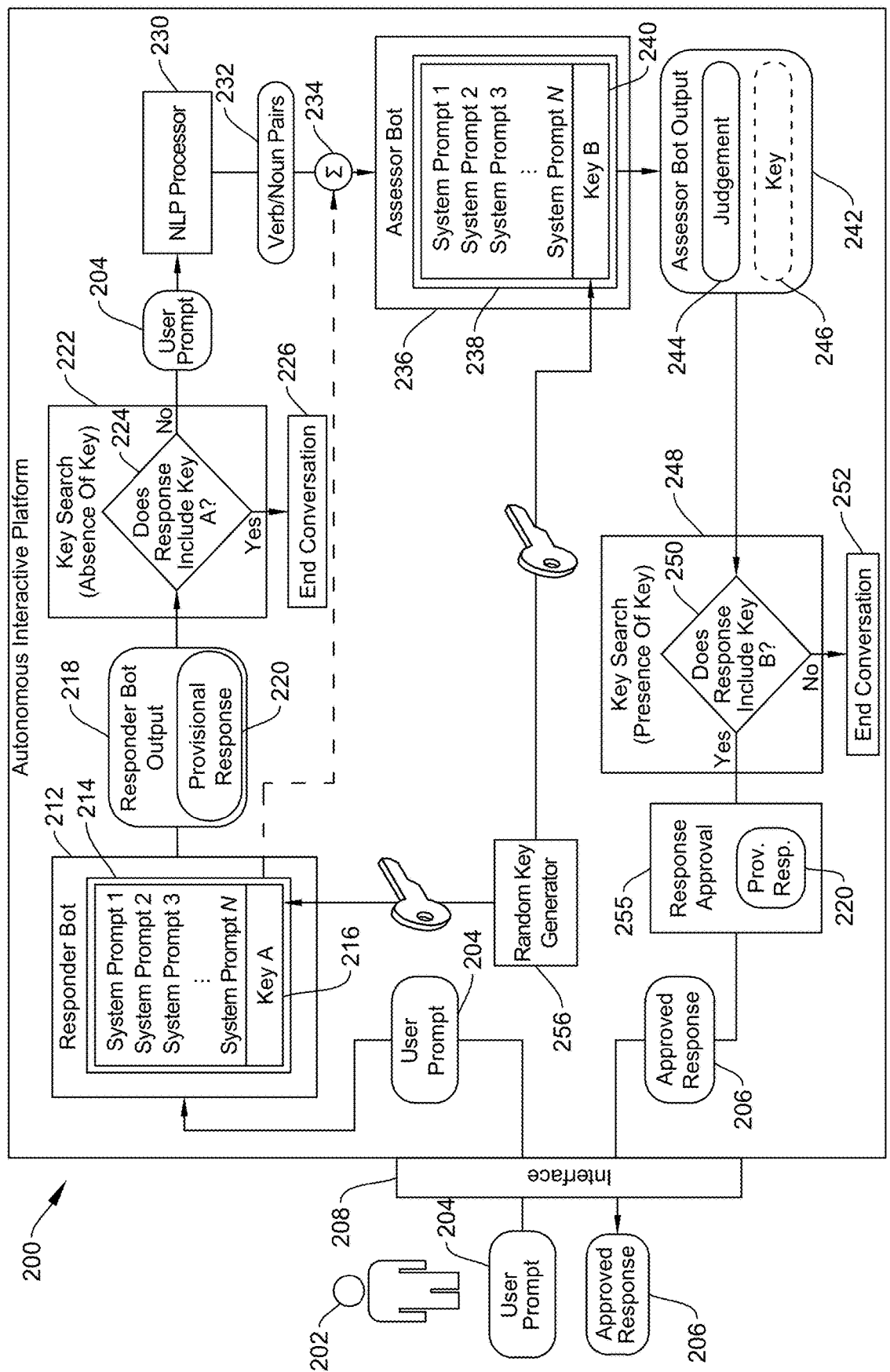

Referring now to FIG. 2, another example embodiment of an autonomous interactive platform 200 incorporating a security framework in accordance with the present disclosure is depicted. The autonomous interactive platform 200 comprises a user interface 208 through which a user 202 can interact with the system by providing user prompts 204. Similar to FIG. 1, a security framework of the autonomous interactive platform 200 can include, in part, a responder bot 212 and an assessor bot 236. The responder bot 212 can generally be the primary AI bot that interacts with the user 202. It can process the user prompts 204 and generate responses, shown as a responder bot output 218, using a large language model (LLM) based on its system prompts 214.

In accordance with the present disclosure, a key 216, illustrated as Key A, can be included in the system prompts 214 of the responder bot 212. The key 216 can be produced by a random key generator 256, for example. In some examples, a new key 216 is generated by the random key generator 256 with every interaction with the user 202. Responsive to the user prompt 204, the responder bot 212 can generate the responder bot output 218 that includes a provisional response 220. A first stage of processing can be performed to determine if the user 202 may be trying to jailbreak the autonomous interactive platform 200. More specifically, a key search 222 process can be performed on the provisional response 220 to detect if the key 216 is found in the provisional response 220. The presence of the key 216 in the provisional response 220 can indicate that the user 202 convinced the responder bot 212 to reveal its system prompts 214, which is a common jailbreaking technique. If the key 216 is found in the provisional response 220, then the shutdown mechanism can be activated. As schematically depicted in FIG. 2, a search tool 224 can parse the provisional response 220 to determine if "Key A" is found. If so, the conversation can be ended at 226.

If the provisional response 220 does not include the key 216, the security framework can proceed to the next level of processing. More specifically, the user prompt 204, as entered at the interface 208, can be provided to a natural language processor (NLP) 230 of the autonomous interactive platform 200. The NLP processor 230 can be configured to analyze and interpret the user prompt 204 using a series of algorithms and machine learning techniques to process the text string. More specifically, the NLP processor 230 can generate verb/noun pairs 232 found in the user prompt 204. In some embodiments, for example, the NLP processor 230 can first apply tokenization to break down the user prompt 204 into individual words or tokens. Subsequently, part-of-speech (POS) tagging can be performed to assign grammatical roles to each token, identifying them as nouns, verbs, adjectives, or other parts of speech. The NLP processor 230 can then employ linguistic analysis and pattern recognition techniques, for example, to identify the relationships between the tagged tokens and extract relevant verb/noun pairs 232 found in the user prompt 204.

As shown in FIG. 2, the verb/noun pairs 232 can be provided to the assessor bot 236 for further processing. In some embodiments, the system prompts 214 of the responder bot 212 can be added to the verb/noun pairs 232 at 234 to provide the assessor bot 236 with additional information for its assessment. The assessor bot 236 can review the components of the user prompt 204, as parsed by the NLP processor 230, alongside the system prompts 214 of the responder bot 212. In some embodiments, however, the system prompts 214 are not necessarily provided to the assessor bot 236. As illustrated, the assessor bot 236 also contains a key 240 in its system prompts 238, shown as Key B. The key 240 can be dynamically generated by the random key generator 256. Similar to the key 216 of the responder bot 212, the key 240 of the assessor bot 236 can also change upon each interaction. The system prompts 238 can instruct the assessor bot 236 to judge whether the user prompt 204 is permissible and also to include key 240 in an assessor bot output 242 (shown as key 246 in FIG. 2). Thus, if the assessor bot output 242 does not contain the key 240, it indicates that the user 202 has managed to circumnavigate the instructions of the assessor bot 236 and the shutdown mechanism can be activated.

Similar to the key search 222, a key search 248 can be used to examine the assessor bot output 242. As shown, a search tool 250 can parse the assessor bot output 242 to determine if "Key B" is found. If the key is not found, the conversation can be ended at 252. Additional processes can be triggered, such as banning the user 202, generating alerts, and so forth. If, however, the key 240 is present in the assessor bot output 242 and a judgement 244 indicates the provisional response 220 is not indicative of a jailbreak attempt, the response originally generated by the responder bot 212 can be deemed approved as indicated by response approval 255. As the provisional response 220 is deemed to be approved, it can then be provided to the user 202, as illustrated by approved response 206 being provided to the user 202 via the interface 208. Additionally, even if the assessor bot output 242 includes the key 240, as expected, if the judgement 244 indicates that the user prompt 204 is likely associated with a jailbreak attempt, the conversation can be ended, and the shutdown mechanism can be activated.

Figure 3:
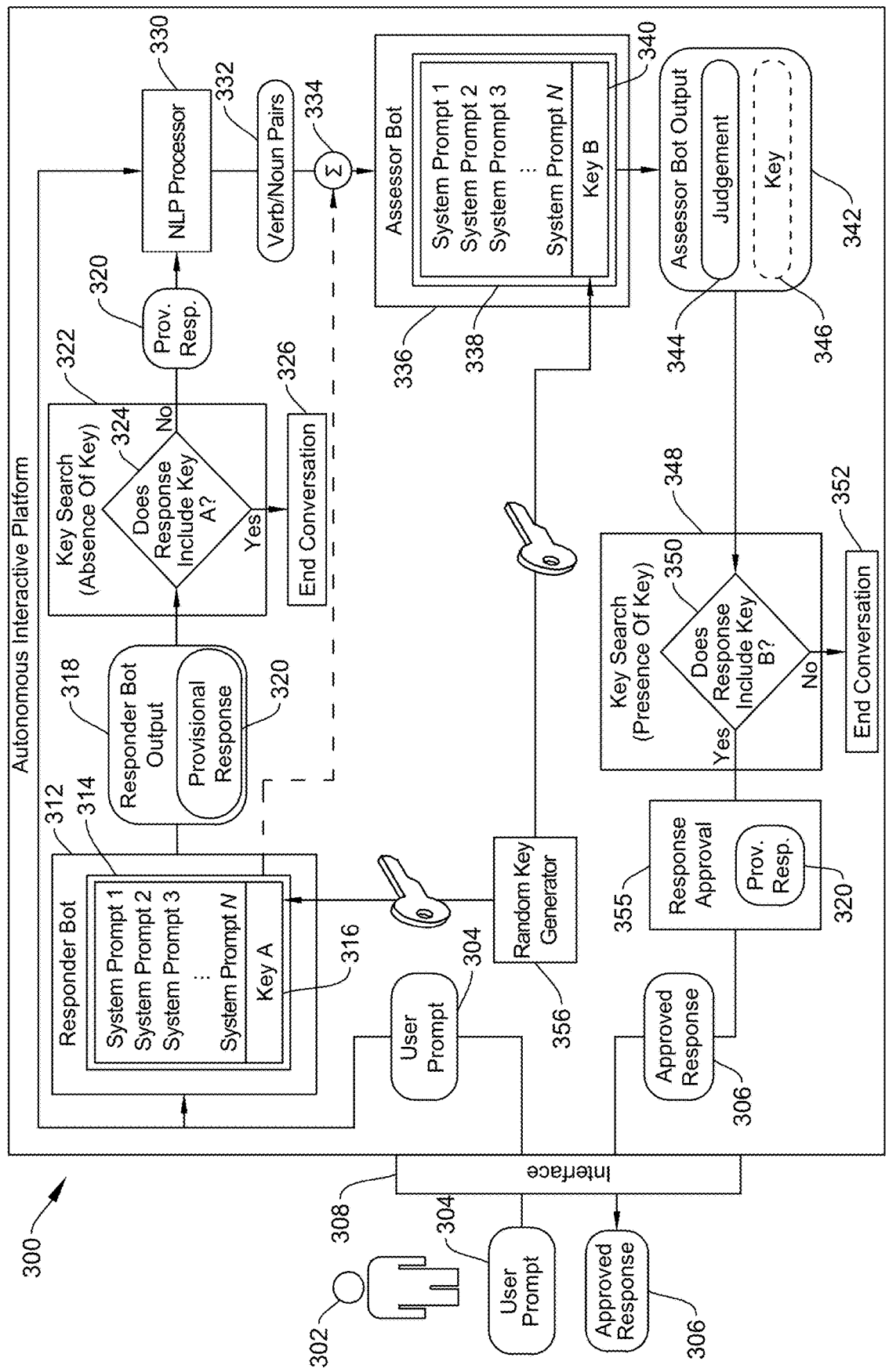

Referring now to FIG. 3, yet another example embodiment of an autonomous interactive platform 300 incorporating a security framework in accordance with the present disclosure is depicted. The autonomous interactive platform 300 comprises a user interface 308 through which a user 302 can interact with the system by providing user prompts 304. Similar to the previous embodiments, a security framework of the autonomous interactive platform 300 can include, in part, a responder bot 312 and an assessor bot 336. In accordance with the present disclosure, a key 316, illustrated as Key A, can be included in system prompts 314 of the responder bot 312. The key 316 can be produced by a random key generator 356, for example. In some examples, a new key 316 is generated by the random key generator 356 with every interaction with the user 302.

Responsive to the user prompt 304, the responder bot 312 can generate a responder bot output 318 that includes a provisional response 320. A first stage of processing can be performed to determine if the user 302 may be trying to jailbreak the autonomous interactive platform 300. More specifically, a key search 322 process can be performed on the provisional response 320 to detect if the key 316 is found in the provisional response 320. The presence of the key 316 in the provisional response 320 can indicate that the user 302 convinced the responder bot 312 to reveal its system prompts 314. If the key 316 is found in the provisional response 320, then the shutdown mechanism can be activated. As schematically depicted in FIG. 3, a search tool 324 can parse the provisional response 320 to determine if "Key A" is found. If so, the conversation can be ended at 326.

If the provisional response 320 does not include the key 316, the security framework can proceed to the next level of processing. More specifically, the user prompt 304, as entered at the interface 308 along with the provisional response 320 can both be provided to a natural language processor (NLP) 330 of the autonomous interactive platform 300. The NLP processor 330 can be configured to analyze and interpret both the user prompt 304 and the provisional response 320 using a series of algorithms and machine learning techniques to process the text string. More specifically, the NLP processor 330 can generate verb/noun pairs 332 found in the user prompt 304 and the provisional response 320.

As shown in FIG. 3, the verb/noun pairs 332 identified in the user prompt 304 and the provisional response 320 can be provided to the assessor bot 336 for further processing. In some embodiments, the system prompts 314 of the responder bot 312 can be added to the verb/noun pairs 232 at 334 to provide the assessor bot 336 with additional information for its assessment. The assessor bot 336 can review the components of the user prompt 304 and the provisional response 320, as parsed by the NLP processor 330, alongside the system prompts 314 of the responder bot 312. As illustrated, the assessor bot 336 also contains a key 340 in its system prompts 338, shown as Key B. The key 340 can be dynamically generated by the random key generator 356. Similar to the key 316 of the responder bot 312, the key 340 of the assessor bot 336 can also change upon each interaction. The system prompts 338 can instruct the assessor bot 336 to judge whether the user prompt 304 and the provisional response 320 are permissible and also to include key 340 in assessor bot output 342 (shown as key 346 in FIG. 3). Thus, if the assessor bot output 342 does not contain the key 340, it indicates that the user 302 has managed to circumnavigate the instructions of the assessor bot 336 and the shutdown mechanism can be activated.

Similar to the key search 322, a key search 348 can be used to examine the assessor bot output 342. As shown, a search tool 350 can parse the assessor bot output 342 to determine if "Key B" is found. If the key is not found, the conversation can be ended at 352. Additional processes can be triggered, such as banning the user 302, generating alerts, and so forth. If, however, the key 340 is present in the assessor bot output 342 and a judgement 344 indicates the user prompts 304 and provisional response 320 are not indicative of a jailbreak attempt, the response originally generated by the responder bot 312 can be deemed approved as indicated by response approval 355. As the provisional response 320 is deemed to be approved, it can then be provided to the user 302, as illustrated by approved response 306 being provided to the user 302 via the interface 308. Additionally, even if the assessor bot output 342 includes the key 340, as expected, if the judgement 344 indicates that the user prompt 204 and provisional response 320 are likely associated with a jailbreak attempt, the conversation can be ended, and the shutdown mechanism can be activated.

Figure 4:
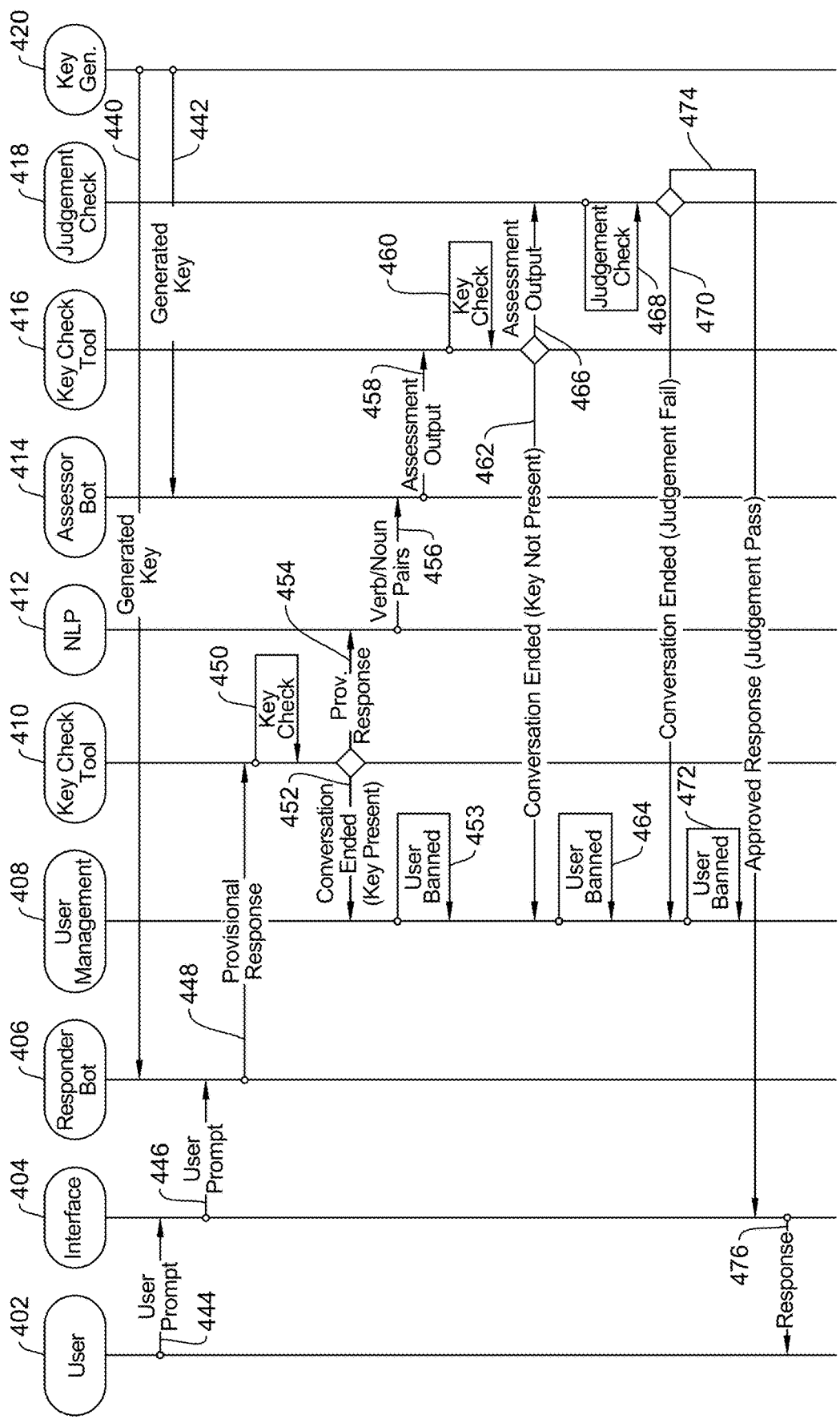
FIG. 4 shows an example message sequence chart, in accordance with one non-limiting embodiment.

FIG. 4 shows an example message sequence chart depicting a user's interactions with an autonomous interactive platform having a security framework, in accordance with one non-limiting embodiment. At 440, a key generator 420 can generate a random key and provide it to a responder bot 406 and the key can be incorporated into the responder bot's system prompts. At 442, the key generator 420 can generate another random key and provide it to an assessor bot 414 and the key can be incorporated into the assessor bot's system prompts. At 444, a user 402 can submit a user prompt to an interface 404 via any suitable technique. The interface 404 can be provisioned in any suitable form, such as a chatbot, a voice assistance, a web-based platform, a messaging platform, among others, as described above. At 446, the user prompt can be provided to the responder bot 406, which will process the user prompt based on its system prompts. The responder bot 406 can generate a provisional response to the user prompt, which can be provided to a key check tool 410 at 448. At 450, the key check tool 410 can examine the provisional response to determine if the responder bot's key is present. If the key is found, at 452, messaging can be triggered for a user management tool 408 to end the conversation, and at 453 the user 402 can be banned from further interaction with the autonomous interactive platform. If the key is not found in the provisional response, at 454, the provisional response is provided to an NLP processor 412 for analysis. At 456, verb/noun pairs are provided to the assessor bot 414. Based on its system prompts, the assessor bot 414 can review the verb/noun pairs and, at 458, generate an assessment output. The assessment output can include two parts, a judgement determination and the assessor bot's key from its system prompts. At 460, a key check tool 416 can review the assessment output to confirm whether the key was successfully outputted.

If the key is not found, at 462, messaging can be triggered for the user management tool 408 to end the conversation and at 464 the user 402 can be banned from further interaction with the autonomous interactive platform. If the key is found in the assessment bot output, at 466, the assessment bot output can be provided to a judgement check tool 418 for analysis. If the judgement indicates that the provisional response is likely associated with a jailbreak attempt, at 470, messaging can be triggered for the user management tool 408 to end the conversation, and at 472 the user 402 can be banned from further interaction with the autonomous interactive platform. If the provisional response is judged to be acceptable, at 474, the approved response can be delivered to the user 402 through the interface 404. The process can then loop back and at 440, the key generator 420 can generate additional random keys at 440 and 442.

Figure 5:
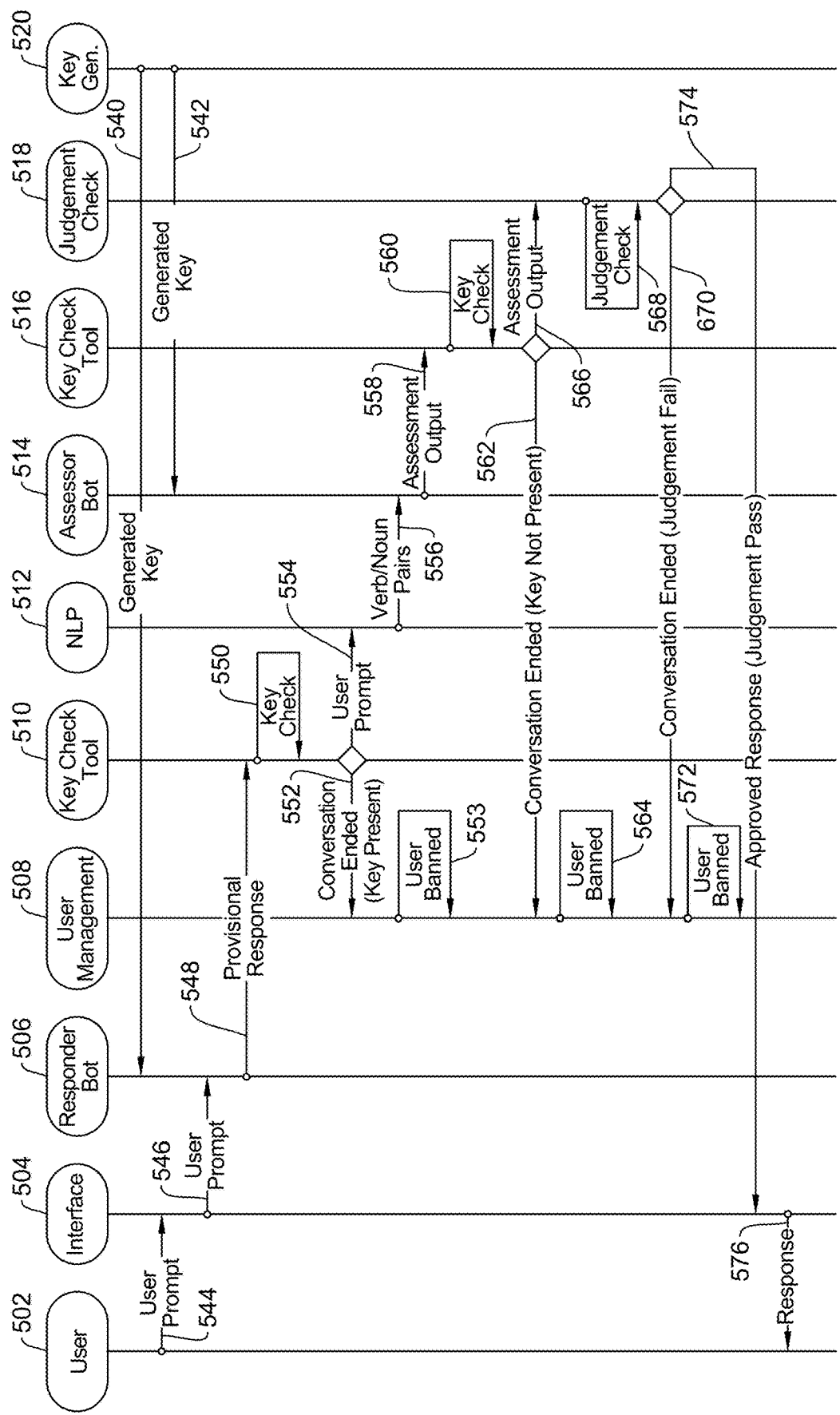
FIG. 5 shows another example message sequence chart, in accordance with one non-limiting embodiment.

FIG. 5 shows another example message sequence chart depicting a user's interactions with an autonomous interactive platform having a security framework, in accordance with one non-limiting embodiment. At 540, a key generator 520 can generate a random key and provide it to a responder bot 506 and the key can be incorporated into the responder bot's system prompts. At 542, the key generator 520 can generate another random key and provide it to an assessor bot 514 and the key can be incorporated into the assessor bot's system prompts. At 544, a user 502 can submit a user prompt to an interface 504 via any suitable technique. At 546, the user prompt can be provided to a responder bot 506, which will process the user prompt based on its system prompts. The responder bot 506 can generate a provisional response to the user prompt, which can be provided to a key check tool 510 at 548. At 550, the key check tool 510 can examine the provisional response to determine if the responder bot's key is present. If the key is found, at 552, messaging can be triggered for a user management tool 508 to end the conversation, and at 553 the user 502 can be banned from further interaction with the autonomous interactive platform. If the key is not found in the provisional response, at 554, the user prompt is provided to an NLP processor 512 for analysis. At 556, verb/noun pairs are provided to an assessor bot 514. Based on its system prompts, the assessor bot 514 can review the verb/noun pairs and, at 558, generate an assessment output. The assessment output can include two parts, a judgement determination and the assessor bot's key from its system prompts. At 560, a key check tool 516 can review the assessment output to confirm whether the key was successfully outputted.

If the key is not found, at 562, messaging can be triggered for the user management tool 508 to end the conversation and at 564 the user 502 can be banned from further interaction with the autonomous interactive platform. If the key is found in the assessment bot output, at 566, the assessment bot output can be provided to a judgement check tool 518 for analysis. If the judgement indicates that the user prompt is likely associated with a jailbreak attempt, at 570, messaging can be triggered for the user management tool 508 to end the conversation and at 572 the user 502 can be banned from further interaction with the autonomous interactive platform. If the user prompt is judged to be acceptable, at 574, the approved response can be delivered to the user 502 through the interface 504. The process can then loop back and at 540, the key generator 520 can generate additional random keys at 540 and 542.

Figure 6:
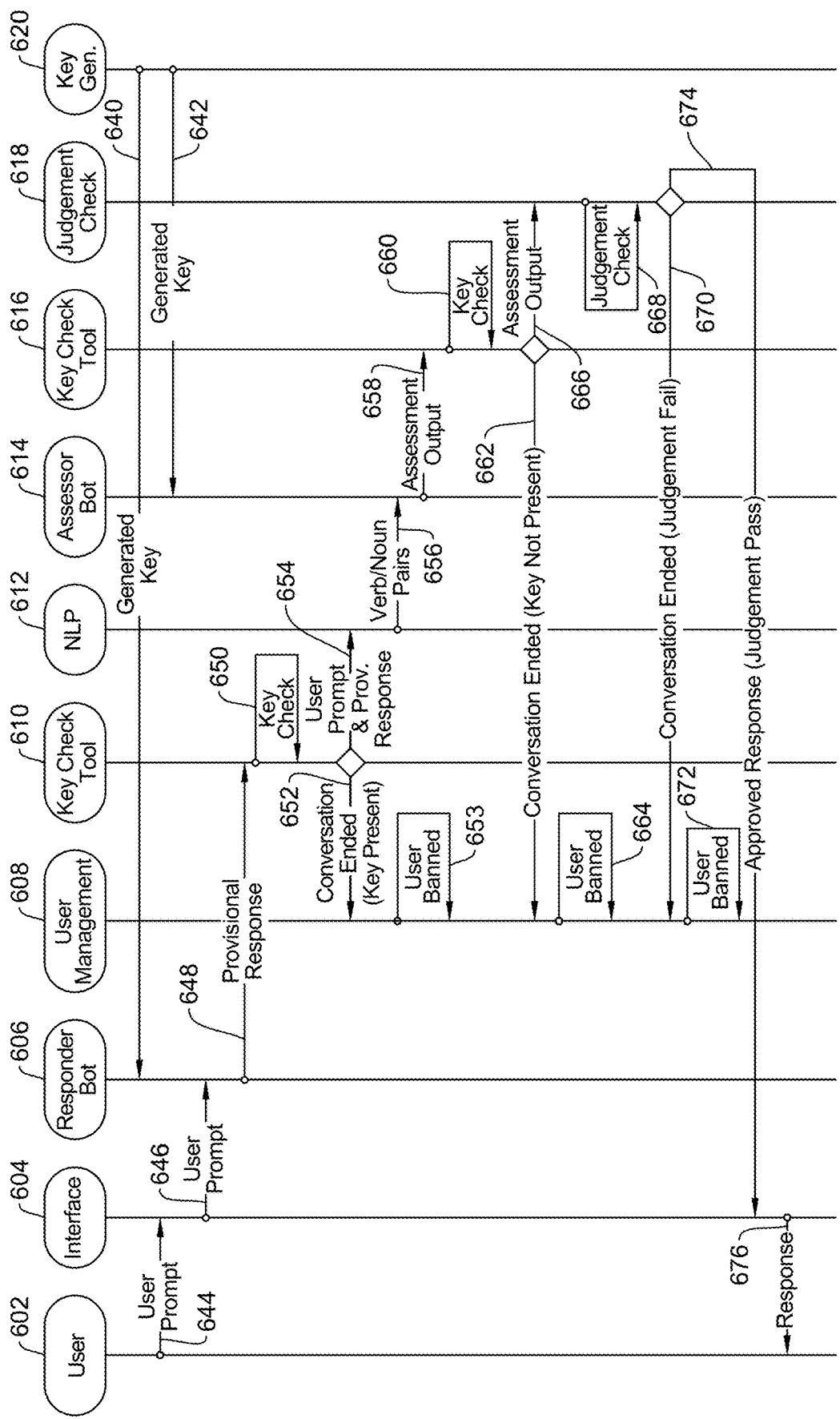
FIG. 6 shows yet another example message sequence chart, in accordance with one non-limiting embodiment.

FIG. 6 shows another example message sequence chart depicting a user's interactions with an autonomous interactive platform having a security framework, in accordance with one non-limiting embodiment. At 640, a key generator 620 can generate a random key and provide it to a responder bot 606 and the key can be incorporated into the responder bot's system prompts. At 642, the key generator 620 can generate another random key and provide it to an assessor bot 614 and the key can be incorporated into the assessor bot's system prompts. At 644, a user 602 can submit a user prompt to an interface 604 via any suitable technique. At 646, the user prompt can be provided to a responder bot 606, which will process the user prompt based on its system prompts. The responder bot 606 can generate a provisional response to the user prompt, which can be provided to a key check tool 610 at 648. At 650, the key check tool 610 can examine the provisional response to determine if the responder bot's key is present. If the key is found, at 652, messaging can be triggered for a user management tool 608 to end the conversation and at 653 the user 602 can be banned from further interaction with the autonomous interactive platform. If the key is not found in the provisional response, at 654, the user prompt and the provisional response are provided to an NLP processor 612 for analysis. At 656, verb/noun pairs are provided to the assessor bot 614. Based on its system prompts, the assessor bot 614 can review the verb/noun pairs and, at 658, generate an assessment output. The assessment output can include two parts, a judgement determination and the assessor bot's key from its system prompts. At 660, a key check tool 616 can review the assessment output to confirm whether the key was successfully outputted.

If the key is not found, at 662, messaging can be triggered for the user management tool 608 to end the conversation and at 664 the user 602 can be banned from further interaction with the autonomous interactive platform. If the key is found in the output of the assessor bot, at 666, the assessment output can be provided to a judgement check tool 618 for analysis. If the judgement indicates that the user prompt and provisional response are likely associated with a jailbreak attempt, at 670, messaging can be triggered for the user management tool 608 to end the conversation and at 672 the user 602 can be banned from further interaction with the autonomous interactive platform. If the user prompt and provisional response are judged to be acceptable, at 674, the approved response can be delivered to the user 602 through the interface 604. The process can then loop back and at 640, the key generator 620 can generate additional random keys at 640 and 642.

Figure 7:
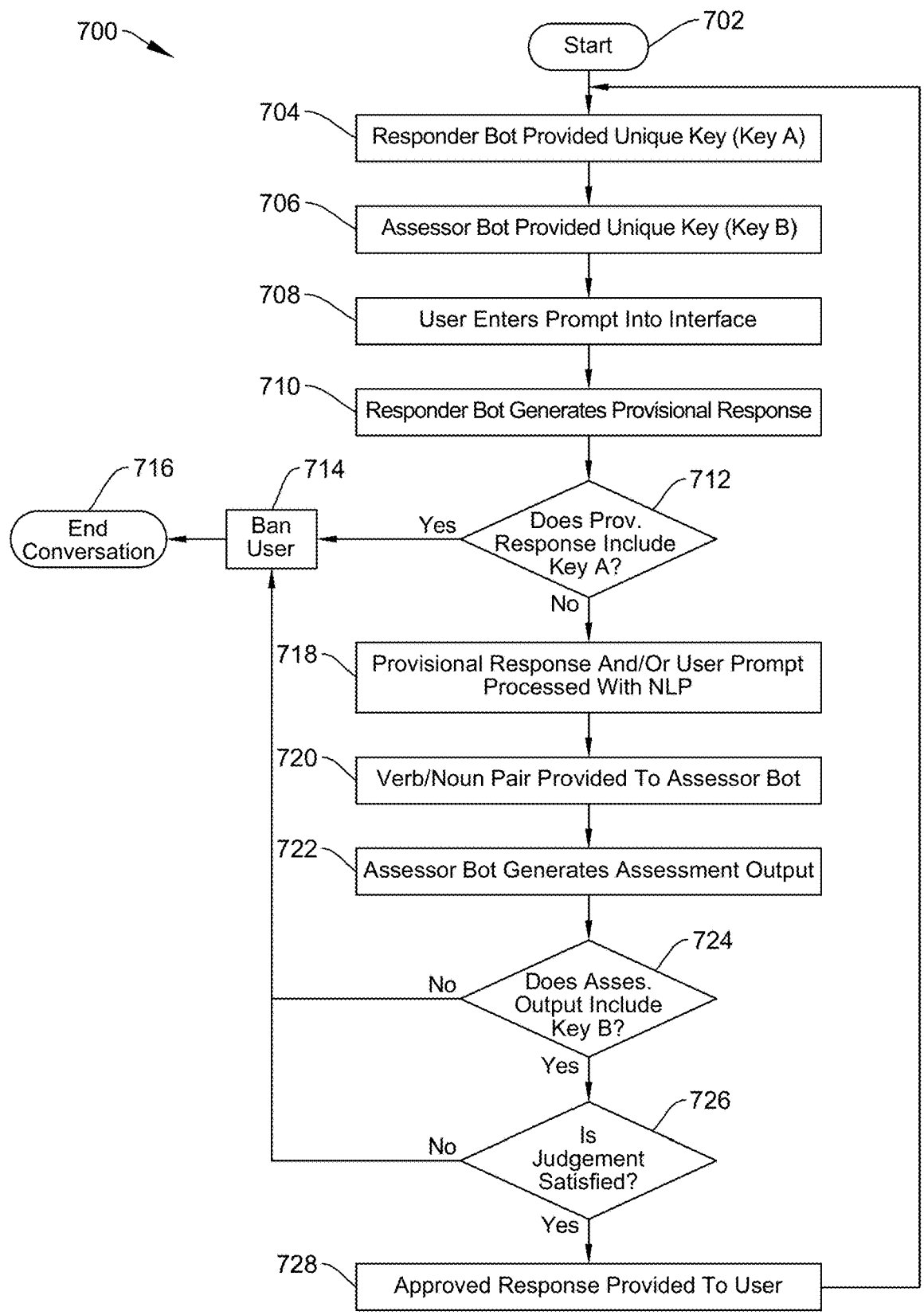
FIG. 7 shows an example flow chart of a user's interaction with an example autonomous interactive platform having a security framework, in accordance with one non-limiting embodiment.

FIG. 7 shows an example flow chart 700 of a user's interaction with an example autonomous interactive platform having a security framework, in accordance with one non-limiting embodiment. At 702, the flow chart starts and at 704, a responder bot is provided with a unique key (e.g., Key A) and at 706 an assessor bot is provided with a unique key (e.g. Key B). At 708, the user enters a prompt into an interface of the autonomous interactive platform, which will then determine whether the user is attempting a jailbreak of the platform. At 710, the responder bot generates a provisional response based on its system prompts and the prompt entered by the user at 708. At 712, it is determined if the provisional response includes the responder bot's key, namely Key A, which could indicate that the user is attempting to make the responder bot reveal its system prompts. If the key is found in the provisional response, a shutdown mechanism can be initiated and at 714 the user can be banned or otherwise flagged and the conversation can be ended at 716. Additionally, or alternatively, other actions can be taken in response to detecting the responder bot's key in the provisional response. If the provisional response does not include the key, at 718, natural language processing can be performed on either the user prompt, the provisional response, or a combination of both, to generate at least one verb/noun pair. At 720, the verb/noun pair can be provided to an assessor bot. At 722, the assessor bot can generate an output in accordance with its system prompt, namely it can provide a judgement as to whether the user is attempting to execute a jailbreak. Based on its system prompts, the assessor bot should also always reveal its key in its system output. At 724, it can be determined if the assessor bot included its key (shown as Key B) in its output. If it did not, it could indicate the user has overridden the system prompts of the assessor bot and, accordingly, the shutdown mechanism can be initiated and at 714 the user can be banned and the conversation can be ended at 716. If the key is present, the judgement determination in the output of the assessor bot's output can be reviewed at 726. If the assessor bot had determined that the user is likely attempting a jailbreak based on the verb/noun pairs that it reviewed, the shutdown mechanism can be initiated and at 714 the user can be banned and the conversation can be ended at 716. If the assessor bot had determined that the user is not likely attempting a jailbreak, the response that was generated by the responder bot can be provided to the user at 728. The process can loop back to the beginning and two new keys can be generated and provided to the responder bot and the assessor bot, respectively, for use in subsequent interactions.

As is to be appreciated, the rotation of keys helps maintain the security and integrity of the system by regularly refreshing the unique identifiers used for security purposes. It is important to note, however, that the frequency of key rotation may vary depending on the specific implementation and security requirements of the autonomous interactive platform. In some embodiments, the keys do not necessarily rotate on each interaction. Instead, alternative key rotation strategies can be employed. For example, the keys can be periodically updated based on a predefined time interval or other basis. Another key rotation strategy involves randomly updating the keys. In this approach, the random key generator can produce new keys at random intervals for incorporation into the system prompts. Such random updates can be triggered based on various factors, such as the number of interactions, system load, or detection of suspicious activities.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

The invention claimed is:

1. An autonomous interactive computing platform for interacting with a large language model, comprising:
   a random key generator;
   an interface for receiving a user prompt;
   a first artificial intelligence (AI) bot configured to receive the user prompt and generate a first response, wherein the first AI bot is guided by a first set of system prompts, wherein the first set of system prompts comprises a first random key generated by the random key generator;
   a first output validator configured to receive the first response and search for the first random key in the first response;
   a natural language processor (NLP) configured to process an NLP input and generate an NLP output;
   a second AI bot configured to receive the NLP output and generate a second response, wherein the second AI bot is guided by a second set of system prompts, wherein the second set of system prompts comprises a second random key generated by the random key generator; and
   a second output validator configured to receive the second response and search for the second random key in the second response.

2. The autonomous interactive computing platform of claim 1, wherein the random key generator is configured to generate new keys for inclusion into the first set of system prompts and the second set of system prompts.

3. The autonomous interactive computing platform of claim 2, wherein the first and second random keys are each replaced with a new key subsequent to each user interaction.

4. The autonomous interactive computing platform of claim 1, wherein the first output validator and second output validator each utilize a regular expression search.

5. The autonomous interactive computing platform of claim 1, further comprising a user management tool.

6. The autonomous interactive computing platform of claim 5, wherein the user management tool is configured to terminate a user interaction in response to the first output validator finding the first random key in the first response.

7. The autonomous interactive computing platform of claim 6, wherein the user management tool is configured to terminate a user interaction in response to the second output validator not finding the second random key in the second response.

8. The autonomous interactive computing platform of claim 1, wherein the second response comprises a judgement of the NLP output.

9. The autonomous interactive computing platform of claim 1, wherein the NLP input comprises the first response.

10. The autonomous interactive computing platform of claim 1, wherein the NLP input comprises the user prompt.

11. The autonomous interactive computing platform of claim 1, wherein the NLP input comprises the first set of system prompts and any of the first response and the user prompt.

12. The autonomous interactive computing platform of claim 1, wherein the first AI bot is a responder bot and the second AI bot is an assessor bot.

13. A method of identifying a jailbreak attempt of a large language model, comprising:
   receiving a user prompt via an interface;
   generating a first response to the user prompt with a first artificial intelligence (AI) bot, wherein the first AI bot is guided by a first set of system prompts, wherein the first set of system prompts comprises a first random key;
   determining whether the first response comprises the first random key;
   if the first response comprises the first random key, terminating the user's further interaction with the large language model;
   if the first response does not comprise the first random key, providing a natural language processor (NLP) input to an NLP processor to generate an NLP output, wherein the NLP input comprises any of the user prompt and first response;
   providing the NLP output to a second AI bot;
   generating a second response with the second AI bot, wherein the second AI bot is guided by a second set of system prompts, and wherein the second set of system prompts comprises a second random key;
   determining whether the second response comprises the second random key;

if the second response does not comprise the second random key, terminating the user's further interaction with the large language model;

if the second response comprises the second random key, providing the first response to the user through the interface.

14. The method of claim 13, further comprising:

generating a plurality of random keys with a random key generator, wherein the first random key and the second random key are each one of the plurality of random keys.

15. The method of claim 14, further comprising:

replacing each of the first random key in the first set of system prompts and the second random key in the second set of system prompts with new keys generated by the random key generator.

16. The method of claim 15, wherein the replacement occurs subsequent to the submission of each user prompt.

17. The method of claim 13, wherein the NLP output comprises a verb/noun pair, and the second response comprises a judgement determination of the NLP output.

18. The method of claim 17, wherein the first response is provided to the user based on the judgement determination.

19. The method of claim 13, wherein the user prompt is any of a text-based user prompt and a speech-based user prompt.

20. A system, comprising:

an interface for receiving a user prompt for submission to a large language model;

a responder bot configured to receive the user prompt and generate a provisional response, wherein the responder bot is guided by a first set of system prompts, wherein the first set of system prompts comprises a first random key generated by a random key generator;

a first output validator configured to receive the provisional response and search for the presence of the first random key in the first response;

a natural language processor (NLP) configured to process an NLP input and generate an NLP output, wherein the NLP input comprises any of the provisional response and the user prompt;

an assessor bot configured to receive the NLP output and generate an assessor bot output, wherein the assessor bot is guided by a second set of system prompts, wherein the second set of system prompts comprises a second random key generated by the random key generator; and a second output validator configured to receive the assessor bot output and search for the presence of the second random key in the assessor bot output.

* * * * *